United States Patent [19]
Ganiaris

[11] 3,879,956
[45] Apr. 29, 1975

[54] ICE CRYSTAL WASH

[76] Inventor: Neophytos Ganiaris, 3671 Hudson Manor Ter., Riverdale, N.Y. 10463

[22] Filed: Apr. 30, 1973

[21] Appl. No.: 355,691

[30] Foreign Application Priority Data
May 1, 1972 United Kingdom............ 020159/72

[52] U.S. Cl. ................................................ 62/123
[51] Int. Cl. ............................................. B01d 9/04
[58] Field of Search........................ 62/58, 123, 124

[56] References Cited
UNITED STATES PATENTS

| | | |
|---|---|---|
| 2,764,488 | 9/1956 | Slattery............................... 62/58 X |
| 3,070,969 | 1/1963 | Ashley et al..................... 62/124 X |
| 3,170,778 | 2/1965 | Roth ........................................ 62/58 |
| 3,202,283 | 8/1965 | Liu..................................... 62/123 X |
| 3,251,192 | 5/1966 | Rich, Jr. et al. ......................... 62/58 |

*Primary Examiner*—Meyer Perlin
*Assistant Examiner*—Ronald C. Capossela
*Attorney, Agent, or Firm*—William Anthony Drucker

[57] ABSTRACT

A slurry of ice crystals and brine or aqueous beverage solution is forced through a conduit against a counterflow of butane or Freon as a wash fluid. The wash fluid emerges from the conduit through perforated or porous wall portions to enter a brine tank in which brine separates from the wash fluid and is removed. Washed crystals emerge from the conduit in a melt tank containing wash fluid. The crystals are melted, separated from the wash fluid, and withdrawn as fresh water. The wash fluid is pumped from the brine tank to the melt tank to cause its counterflow through the ice crystals. Alternately, the wash fluid may be introduced along the length of the conduit to flow to both tanks and be recirculated.

9 Claims, 3 Drawing Figures

PATENTED APR 29 1975 3,879,956 to wash ice crystals formed from sea water.

ICE CRYSTAL WASH

BACKGROUND OF THE INVENTION

Ice crystals formed in solution, as in the freeze conversion of sea water to fresh water or orange juice concentration, are conventionally washed with fresh water using a number of different methods. All water washing of ice crystals requires fresh wash water amounting to 5 to 15 percent by weight of the ice crystals recovered under the best circumstances. The butane or Freon washing of ice crystals according to this invention saves this wash water and washes the crystals more efficiently.

DESCRIPTION OF THE PREFERRED EMBODIMENTS

The ice crystals to be washed in the practice of this invention will generally be obtained by the direct contact crystallization of ice from water. The refrigerant which is introduced into the water to form ice crystals therein will also be available to be used as a wash fluid for the ice crystals so produced.

Figure 1:
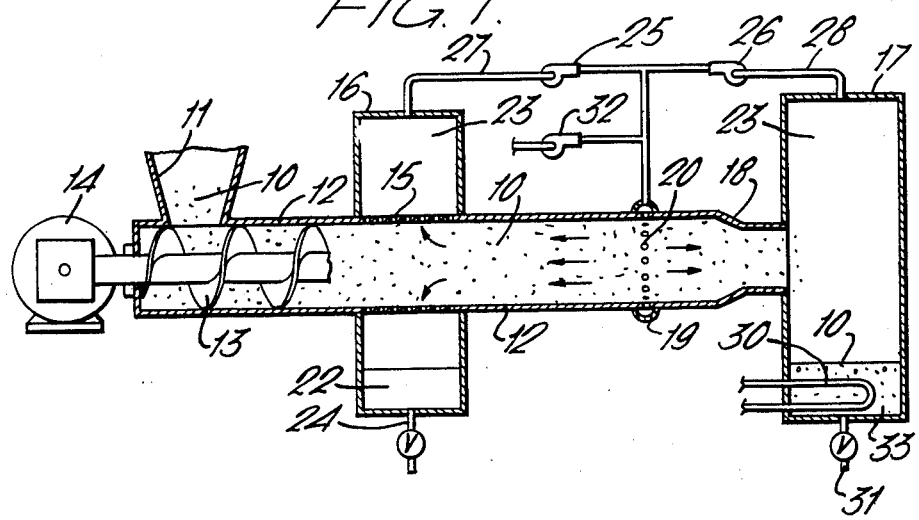
FIG. 1 is a longitudinal, vertical section through a crystal washing apparatus according to this invention using butane as a wash fluid.

As shown in FIG. 1, ice crystals 10 in a slurry or slush are dropped into hopper 11 by any conventional apparatus (not shown). Hopper 11 enters conduit 12 which contains a screw conveyor 13 driven by gear head motor 14. Conveyor 13 compacts the crystals and moves them down conduit 12 at twelve feet per minute or less.

The portion 15 of the wall of conduit 12 passing through brine tank 16 is finely perforated or porous. The end of conduit 12 entering melt tank 17 is constricted at 18. An annular jacket 19 introduces liquid butane into conduit 12 between tanks 16 and 17 through orifices 20. The butane flows against the motion of the ice crystals 10 to conduit 12 to escape through porous wall 15 into brine tank 16. Brine entering conduit 12 from hopper 11 is squeezed from the ice crystals 10 to flow through porous wall 15. Brine washed from crystals 10 by butane also flows through porous wall 15. The brine 22 in tank 16 settles in the liquid butane 23 to be withdrawn through pipe 24.

Some butane flows to tank 17 from the orifices 20, but constriction 18 reduces the flow of butane as it packs the crystals 10 more tightly together. Butane is pumped by pumps 25 and 26 through the pipes 27 and 28 to jacket 19 to provide a constant recycling of liquid butane as a wash fluid. In tank 17 ice crystals settle in the butane to be melted by a heat exchanger coil 30 or the like. Resulting fresh water 33 is withdrawn through pipe 31.

The brine and fresh water are further debutanized under a vacuum and the recovered butane returned to the system. This recovered butane and additional butane to make up for losses in the system as returned by pump 32. The temperature of the liquid butane is best controlled by its pressure. If crystal washing requires some melting of the crystals, the temperature of the butane can be raised above 32°F., although effective crystal washing can generally be carried out below 32°F.

Figure 2:
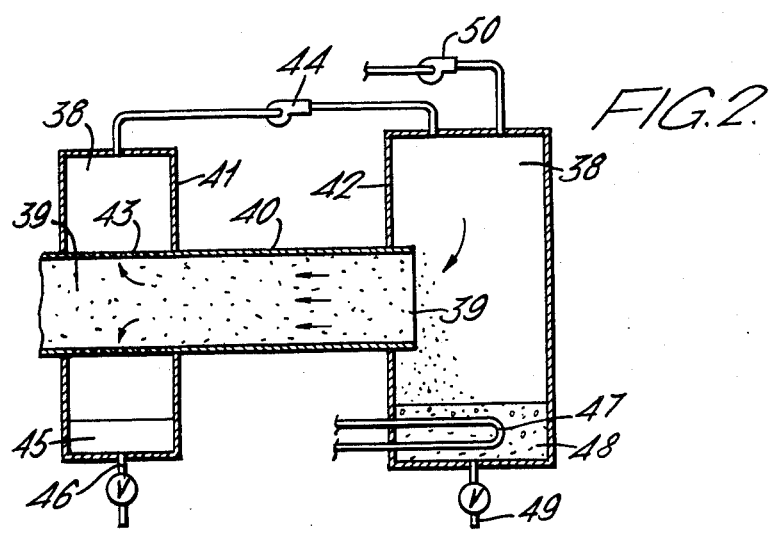
FIG. 2 is a longitudinal, vertical section through an end of a conduit, a brine tank, and a melt tank showing a second embodiment of this invention using butane as a wash fluid.

Referring now to FIG. 2, a conduit 40 similar to that shown in FIG. 1, has an ice crystal and brine slurry or slush 39 forced through it by a conveyor (not shown). Conduit 40 passes through a brine tank 41 to a melt tank 42 and has a porous wall portion 43 within tank 41. Pump 44 draws liquid butane 38 from tank 41 and passes it to tank 42 so that the butane flows countercurrent against the movement of ice crystals 39 in conduit 40 to wash them. Butane and brine washed from the crystals 39 flow through wall 43. The brine 45 settles butane 38 from tank 41 and passes it to tank 42 so that the butane flows countercurrent against the movement of ice crystals 39 in conduit 40 to wash them. Butane and brine washed from the crystals 39 flow through wall 43. The brine 45 settles from the butane 38 and is withdrawn through pipe 46. The washed ice crystals 39 enter tank 42 and settle in the liquid butane therein to be melted by coil 47 and form fresh water 48 which is withdrawn through pipe 49. Pump 50 replaces butane lost from the system. The withdrawn brine and fresh water are further debutanized. The temperature of the liquid wash butane is controlled by partially flashing it to a vapor at a given pressure as is well known. If desired, the butane wash may be above 32°F. to provide controlled surface melting on the crystals to ensure complete brine removal.

Figure 3:
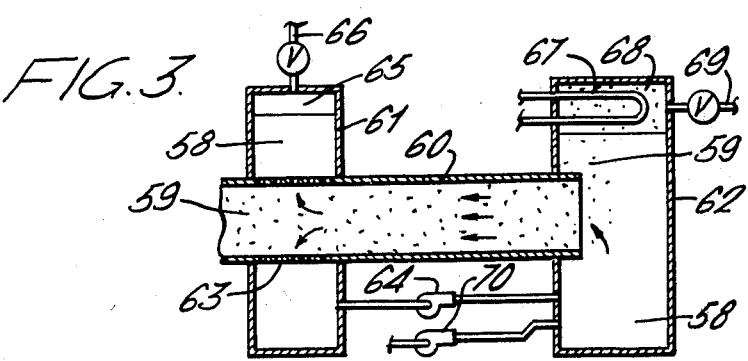
FIG. 3 is a longitudinal, vertical section through an end of a conduit, a brine tank, and a melt tank showing a third embodiment of this invention using Freon as a wash fluid.

FIG. 3 shows an ice crystal wash apparatus similar to that shown in FIG. 2 except that liquid Freon is used as the wash fluid. A conduit 60 has an ice crystal and brine slush 59 force through it by a conveyor (not shown). Conduit 60 passes through a brine tank 61 to a melt tank 62 and has a porous wall portion 63 within tank 61. Pump 64 draws liquid Freon 58 from tank 61 and passes it to tank 62 so that the Freon flows against the ice crystal slush 59 to wash the ice crystals. Freon and brine washed from the crystals flow through wall 63. The brine 65 floats on the Freon 58 and is withdrawn through pipe 66. The washed ice crystals 59 enter tank 62 and float in the liquid Freon therein to be melted by coil 67 and form fresh water 58 which is withdrawn through pipe 69. The withdrawn brine and fresh water may be further stripped of Freon. Pump 70 replaces Freon lost from the wash portion of the system. The temperature of the liquid Freon is maintained by pressure and may also be raised above 32°F. if desired.

The apparatus shown in FIG. 1 may also be modified to wash ice crystals with liquid Freon. The tanks 16 and 17 would be inverted with associated pumps and piping so that fresh water and brine could be removed from the tops of the tanks.

Many Freons may be used such as Freon 318 which boils at 21.5°F. at atmospheric pressure and thus should be used under a slight vacuum. However, Freon 318 is relative expensive.

A main feature of this invention is to use a mixture of Freon 114 and Freon 12 is a proportion of about 80:20 which provides a boiling point in the desired temperature range at a low cost for the Freon. This proportion may be varied between 60:40 and 90:10 and still operate sufficiently close to desired pressures in the wash apparatus. Freon 12 forms hydrates when used along; however, the mixture of Freon 12 and Freon 114 will not form hydrates.

In summary, the process of this invention involves forcing a slush of brine and ice crystals along a conduit and forcing liquid butane or Freon through the crystals as a wash liquid to remove the brine. The wash liquid is forced at least partly against the movement of the crystals in the conduit and flows from the conduit through a porous wall portion into a tank in which brine and the wash liquid separate. A second tank at the end of the conduit receives washed ice crystals which are melted as they separate from the wash liquid. The wash liquid is recirculated. This process more effectively removes adhering brine from ice crystals with no use of fresh wash water and is thus more efficient.

In place of brine we may use citrus juice, coffee or tea as well as beer or wine.

What is claimed is:

1. Apparatus for washing ice crystals formed by direct contact with a refrigerant comprising, in combination, a conduit having an entrance end, an intermediate portion containing fine passages therethrough, and an exit end; means forcing a slurry of ice crystals into the entrance end of said conduit past said intermediate portion to pass from said exit end; and means introducing direct contact refrigerant into the conduit after said intermediate portion forcing the direct contact refrigerant to flow countercurrent against the slurry and to flow from the conduit with matter washed from ice crystals through the fine passages in said intermediate portion; and wherein said ice crystals are formed in a brine solution such as sea water and with the addition of a brine tank disposed about said intermediate portion of said conduit, refrigerant and brine washed from the ice crystals separating in said brine tank.

2. The combination according to claim 1 wherein said means introducing refrigerant into said conduit recirculates refrigerant separated in said brine tank, and with the addition of means to withdraw brine from said brine tank.

3. The combination according to claim 2 wherein said exit end of said conduit is constricted packing ice crystals together reducing fluid flow therethrough and wherein said means introducing refrigerant into said conduit introduces said refrigerant between said intermediate portion and said constriction.

4. The combination according to claim 3 with the addition of a melt tank containing heating means, said exit end of said conduit discharging into said melt tank so that ice crystals are melted therein and refrigerant and water separate therein, said means introducing refrigerant into said conduit recirculating refrigerant separated in said melt tank, said melt tank having means to withdraw water therefrom.

5. The combination according to claim 4 wherein said direct contact refrigerant is butane, said brine tank has brine settle therein in butane, said melt tank has ice crystals and water settle therein in butane, said heating means is in the bottom of said melt tank, and said means introducing butane into said conduit draws butane from the upper portions of said brine tank and said melt tank.

6. The combination according to claim 4 wherein said direct contact refrigerant is Freon, said brine tank has brine float therein in Freon, said melt tank has ice crystals and water float therein in Freon, said heating means is in the top of said melt tank, and said means introducing Freon into said conduit draws Freon from the lower portions of said brine tank and said melt tank.

7. The combination according to claim 2 with the addition of a melt tank containing heating means and having means to withdraw water therefrom, said exit end of said conduit discharging into said melt tank so that ice crystals are melted therein and refrigerant and water separate therein, said means introducing refrigerant into said conduit drawing refrigerant from said brine tank and introducing said refrigerant into said melt tank to flow countercurrent into the exit end of said conduit.

8. The combination according to claim 7 wherein said refrigerant is butane, said brine tank has brine settle therein in butane, said melt tank has ice crystals and water settle therein in butane, said heating means is in the bottom of said melt tank, and said means introducing butane into said conduit draws butane from the upper portion of said brine tank and introduces it into the upper portion of said melt tank.

9. The combination according to claim 7 wherein said refrigerant is Freon, said brine tank has brine float therein in Freon, said melt tank has ice crystals and water float therein in Freon, said heating means is in the upper portion of said melt tank, and said means introducing Freon into said conduit draws Freon from the bottom of said brine tank and introduce it into the bottom portion of said melt tank.

* * * * *